US006356512B1

(12) United States Patent
Martin et al.

(10) Patent No.: US 6,356,512 B1
(45) Date of Patent: Mar. 12, 2002

(54) SUBASSEMBLY COMBINING AN ANTENNA AND POSITION SENSORS ON A SAME SUPPORT, NOTABLY FOR A HOROLOGICAL PIECE

(75) Inventors: Jean-Claude Martin, Neuchâtel; Emil Zellweger, Lommiswil; Alexandre Pollini, Peseux, all of (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/118,911

(22) Filed: Jul. 20, 1998

(51) Int. Cl.[7] .......................... G04B 37/00; H04B 1/38; H04B 1/03

(52) U.S. Cl. .......................... 368/10; 368/88; 368/276; 368/295; 368/316; 455/90; 343/718

(58) Field of Search ............................. 368/47, 10, 69, 368/70, 88, 281, 282, 295, 294, 316, 224, 225, 276; 343/700, 702, 718; 455/41, 90, 129

(56) References Cited

U.S. PATENT DOCUMENTS

| | | | | | |
|---|---|---|---|---|---|
| 4,028,509 | A | * 6/1977 | Zurcher | 368/10 |
| 4,064,552 | A | * 12/1977 | Angelucci et al. | 361/414 |
| 4,072,004 | A | * 2/1978 | Tanaka et al. | 368/10 |
| 4,725,827 | A | 2/1988 | Gallegos, Jr. et al. | |
| 4,847,818 | A | * 7/1989 | Olsen | 368/10 |
| 4,916,577 | A | * 4/1990 | Dawkins | 343/700 |
| 4,987,425 | A | * 1/1991 | Zahn et al. | 343/700 |
| 5,172,348 | A | * 12/1992 | Paratte | 368/47 |
| 5,331,608 | A | * 7/1994 | Umemoto et al. | 368/10 |
| 5,367,502 | A | * 11/1994 | Barroso et al. | 368/10 |
| 5,508,978 | A | * 4/1996 | Kalbermatter et al. | 368/10 |
| 5,564,082 | A | * 10/1996 | Blonder et al. | 368/10 |
| 5,696,518 | A | * 12/1997 | Itoh et al. | 368/10 |
| 5,699,319 | A | * 12/1997 | Skrivervik | 368/10 |
| 5,737,699 | A | * 4/1998 | Farrar et al. | 368/10 |
| 5,781,162 | A | * 7/1998 | Peterson et al. | 343/700 |
| 5,798,984 | A | * 8/1998 | Koch | 368/47 |
| 5,844,523 | A | * 12/1998 | Brennan et al. | 343/700 |
| 5,898,644 | A | * 4/1999 | Ganter et al. | 368/47 |
| 5,907,522 | A | * 5/1999 | Teodoridis et al. | 368/10 |
| 5,926,144 | A | * 7/1999 | Bolanos et al. | 368/10 |
| 5,963,181 | A | * 10/1999 | Hiroyuki | 368/10 |
| 5,972,484 | A | * 10/1999 | Cohen et al. | 343/700 |
| 5,982,328 | A | * 11/1999 | Drevon | 343/700 |
| 6,016,126 | A | * 1/2000 | Holshouser | 343/702 |

FOREIGN PATENT DOCUMENTS

| | | |
|---|---|---|
| EP | 741433 | 5/1995 |
| EP | 715233 | 11/1995 |
| EP | 766152 | 9/1996 |

* cited by examiner

*Primary Examiner*—Diego Gutierrez
*Assistant Examiner*—Jeanne-Marguerite Goodwin
(74) *Attorney, Agent, or Firm*—Sughrue Mion, PLLC

(57) ABSTRACT

The invention concerns a subassembly intended to be mounted in a portable device enabling the reception and/or emission of radio diffused messages as well as the selection of predetermined digital information. This subassembly comprises an antenna (4) and position sensors (6.1 to 6.12) disposed an a same isolating support (30). The subassembly is realised in manner such that mutual perturbations created by the combination of the antenna (4) and the position sensors (6.1 to 6.12) are avoided.

The invention further relates to a horological piece (1) comprising such a subassembly wound in a peripheral region of the watch case (2).

8 Claims, 3 Drawing Sheets

SUBASSEMBLY COMBINING AN ANTENNA AND POSITION SENSORS ON A SAME SUPPORT, NOTABLY FOR A HOROLOGICAL PIECE

BACKGROUND OF THE INVENTION

The present invention relates to a subassembly comprising an antenna adapted to receive and/or emit an electromagnetic field bearing radio diffused messages and position sensors disposed on a same support, this subassembly being intended to be mounted in a portable device such as a horological piece. The present invention thus also concerns a horological piece comprising such a subassembly and enabling notably a user to dial, make and receive phone calls.

SUMMARY OF THE INVENTION

There is known from patent application EP 0 766 152 in the name of the Applicant, a horological piece comprising an antenna adapted to receive and/or emit an electromagnetic field bearing radio diffused messages. This antenna is formed on a dielectric substrate disposed in a mounting slot defined by a spacing existing between a first and a second case. This antenna may be realised independently from the other components of the horological piece and may in addition be easily mounted in the horological piece during its assembly.

There is known in addition from patent application EP 0 715 233, also in the name of the Applicant, a horological piece comprising means for selecting predetermined digital information. This selecting means is formed of position sensors provided in angular sectors defined on the periphery of the horological piece, for instance, beside indicia of a conventional time display. The position sensors are typically formed of capacitive sensors that the user can activate with the placement of a finger. Such capacitive sensors are described, for example in patent CH 623 195.

The antenna and the position sensors form respectively first and second independent blocks both situated in a peripheral region of the horological piece. The separation of these two blocks increases, on one hand, the encumbrance of the horological piece. On the other hand, the mounting of the positions sensors in the horological piece also constitutes a relatively delicate and complex task.

The present invention has thus as a purpose to provide a subassembly combining an antenna and position sensors on a same support in such a manner that its construction as well as its mounting, in particular in a horological piece, is simplified. In addition, the present invention also has as a purpose to reduce the encumbrance of the portable device, for example a horological piece, in which this subassembly is intended to be mounted.

It is to be noted however that the combination of the peripheral blocks formed respectively by the antenna and the position sensors leads to perturbations of the functioning of the subassembly. Indeed, electrically speaking, the antenna and the position sensors constitute respectively a high-frequency block and a low-frequency block which mutually interfere. The presence of the position sensors in proximity of the antenna indeed affects its functioning. Reciprocally, a radiation emanating from the antenna affects the functioning of the sensors and their electronic control means by coupling.

The combination of the two peripheral blocks thus constitutes a task which is at first not desirable for one skilled in the art. The present invention has thus also as a purpose to provide a subassembly combining in an optimal manner an antenna and position sensors on a same support so that their respective functioning is not perturbed.

To this effect, the present invention has as an object a subassembly intended to be mounted in a portable device enabling the reception and/or emission of radio diffused messages as well as the selection of predetermined information, this subassembly being characterized in that it comprises, disposed on a same isolating (insulating) support, an antenna comprising a radiating element adapted to receive and/or emit an electromagnetic field bearing said radio diffused messages, and position sensors arranged to enable said selection of predetermined information.

The present invention has as a further object a horological piece comprising a subassembly such as defined hereinabove.

An advantage of the present invention thus lies in the fact that the antenna-sensors subassembly is independent from the other components of the portable device in which it is intended to be mounted. In consequence, the present invention permits a simplification of the construction and, accordingly, a greater flexibility during fabrication. In addition, this advantage has also an effect on the mounting and assembly of the portable device as such.

Another advantage of the present invention ties in the fact that the combination of the two peripheral blocks permit to reduce the encumbrance of the portable device in which this subassembly is intended to be mounted.

Still another advantage of the present invention lies in the fact that the arrangement of the antenna and position sensors according to the present invention permits to remedy the mutual perturbations created by the combination of the two peripheral blocks and thus to lead to an optimal functioning of the subassembly.

Other characteristics and advantages of the present invention will come apparent from the reading of the detailed description which follows, made with reference to the annexed drawings given purely as examples.

DESCRIPTION OF PREFERRED EMBODIMENTS

Figure 1:
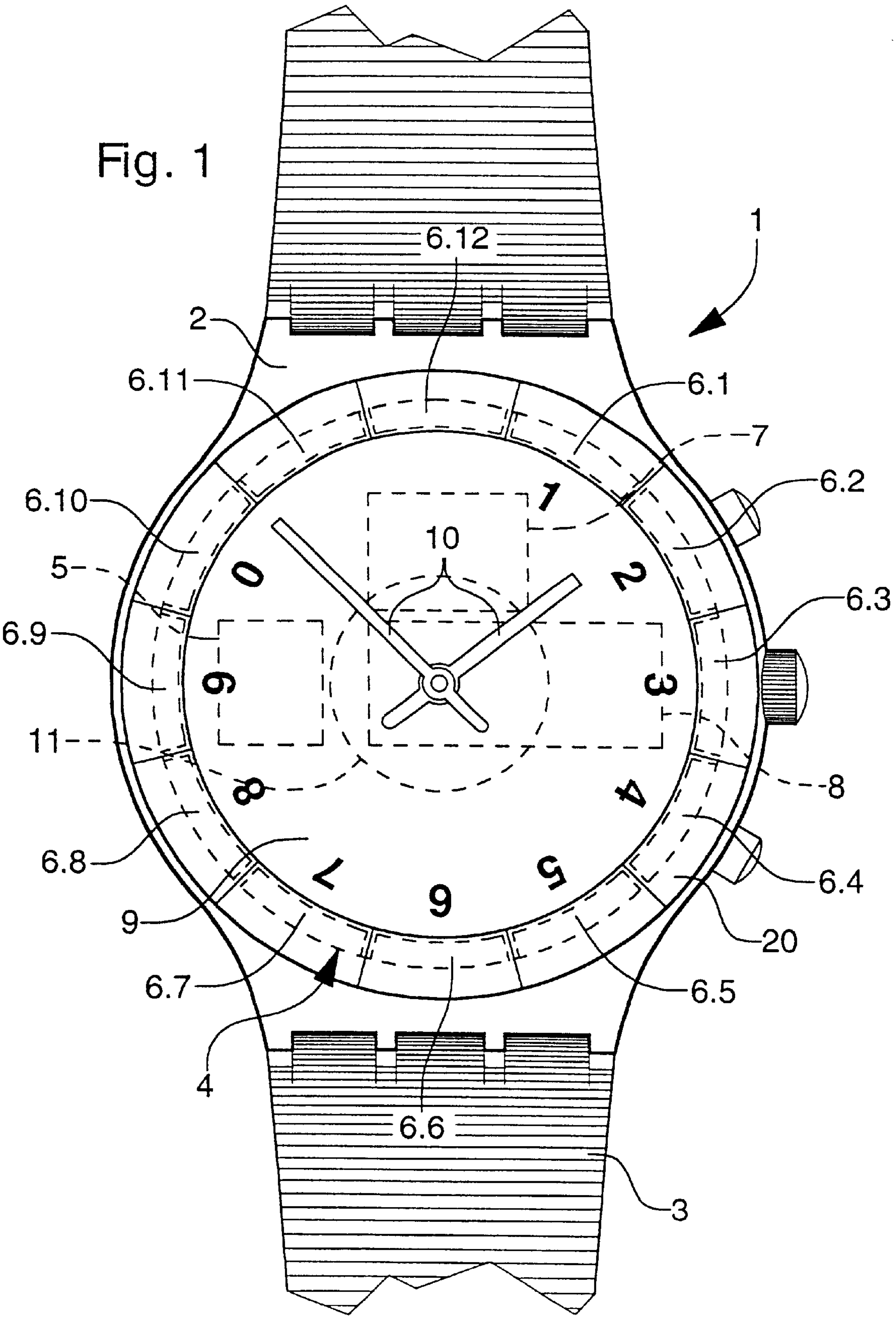
FIG. 1 represents a plan view of a horological piece according to the present invention.

There is represented in FIG. 1, a plan view of a horological piece according to the present invention. This horological piece, here as a wristwatch 1, comprises a watch case 2 and a wristband 3. The watch case 2 comprises a power supply source 11 and organs for displaying the time comprising notably a horological movement 8, a dial 9, and hands 10.

In order to detect an electromagnetic field bearing radio diffused messages, the horological piece 1 comprises an antenna 4 wound in a peripheral region of the watch case 2. A micro emitter-receiver 5 is connected to the antenna 4 in a manner such that it can receive or emit messages with the latter and then transform these messages into data perceptible by the bearer of the horological piece 1, for example, by emitting audible signals.

The horological piece 1 further comprises means for selecting and inputting predetermined information, for example digital information, notably in order to enable the dialing of phone numbers. To this effect, the horological piece 1 comprises position sensors 6.1 to 6.12 provided in angular sectors of the horological piece 1, and electronic control means 7 of the position sensors 6.1 to 6.12 disposed inside the watch case 2.

In the example illustrated in FIG. 1, the position sensors 6.1 to 6.12 are advantageously placed on a bezel 20 of the horological piece 1. In addition, it is to be pointed out that the position sensors 6.1 and 6.12 are arranged, in a non limitative manner, beside time indicia of a conventional time display. It has to be said that another possible variant would consist in providing the positions sensors 6.1 and 6.12 not on the bezel but under a watch glass of the horological piece. In FIG. 1, the position sensors 6.1 to 6.12 are respectively placed beside the time indicia 1h to 12h. It is to be noted again that this particular disposition is in no way limitative. However, the disposition of the position sensors with respect to the antenna 4 should be realised, as described hereinafter, in such a way that the functioning of the latter is not perturbed.

The placement of a user's finger on one of the position sensors 6.1 to 6.12 of the horological piece 1 provokes the selection of the corresponding digital information. The dial 9 thus comprises, for example, indicia "1" to "9" and "0" respectively confounded with indicia 1h to 9h and 10h of the conventional time display, so that the user can make a call by successively activating the corresponding position sensors 6.1 to 6.10. The functioning of the means for selecting and inputting predetermined information will not be described in more details here. A detailed explanation of the functioning of such means can indeed be found in patent application EP 0 715 233, in the name of the Applicant, already described in the preamble part.

Figure 2:
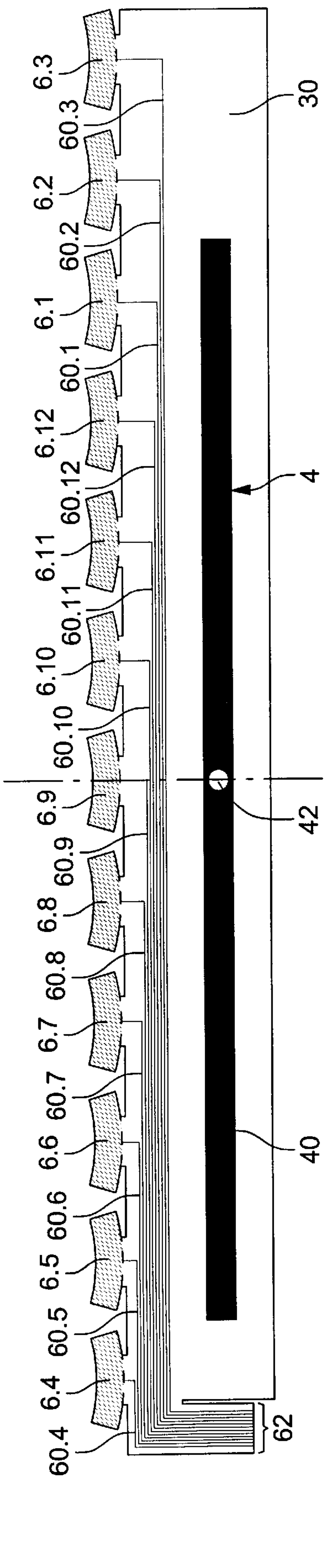
FIG. 2 represents an embodiment of a subassembly combining, on one side of the support, an antenna, and on the other side of the support, position sensors according to the present invention.

FIG. 2 represents an embodiment of a subassembly combining the antenna 4 and the position sensors 6.1 to 6.12 according to the present invention. The antenna 4 and the position sensors 6.1 to 6.12 are disposed on a same isolating support 30. This isolating support 30 is preferably flexible in order to facilitate the assembly of the antenna 4 and the position sensors 6.1 to 6.12 in the horological piece. With respect to this, it is convenient to use as isolating support a dielectric polyimide substrate having a thickness of about 100 mm.

The antenna 4 is preferably formed on a side (in the background of FIG. 2) of the isolating support 30. It comprises a printed circuit conductive element defining a radiating element 40 of the antenna 4. This element is preferably constituted by a metallic deposition on the isolating support 30.

The radiating element 40 defines a dipole the length of which is preferably equal to approximately $\lambda/2$, where $\lambda$ is the working wave length of the antenna, i.e. the wave length of the electromagnetic signal used to emit and/or receive the radio diffused messages.

The antenna 4 further comprises, half way along the radiating element, a connecting point 42 enabling to connect it to the micro emitter-receiver 5. During mounting the antenna is directed towards the exterior for optimal efficiency.

The position sensors 6.1 to 6.12 are disposed on the opposite surface (in the foreground of FIG. 2) of the isolating support 30. During mounting the sensors are thus directed towards the interior of the horological piece. Connecting lines 60.1 to 60.12 permitting to connect the respective position sensors 6.1 to 6.12 are also provided on the isolating support 30 in order to connect them to the electronic control means 7. To this effect, a connector 62 is provided at one extremity of the isolating support 30.

In order to remedy the perturbations of the functioning of the antenna 4 created by the presence of the position sensors 6.1 to 6.12 and the connecting lines 60.1 to 60.12, these are disposed so that they form, when the antenna-sensors subassembly is mounted in the horological piece 1, a symmetric arrangement with respect to the antenna 4. The connecting lines 60.1 to 60.12 are furthermore disposed so as to perturb the least possible the antenna located on the other side.

Figure 3:
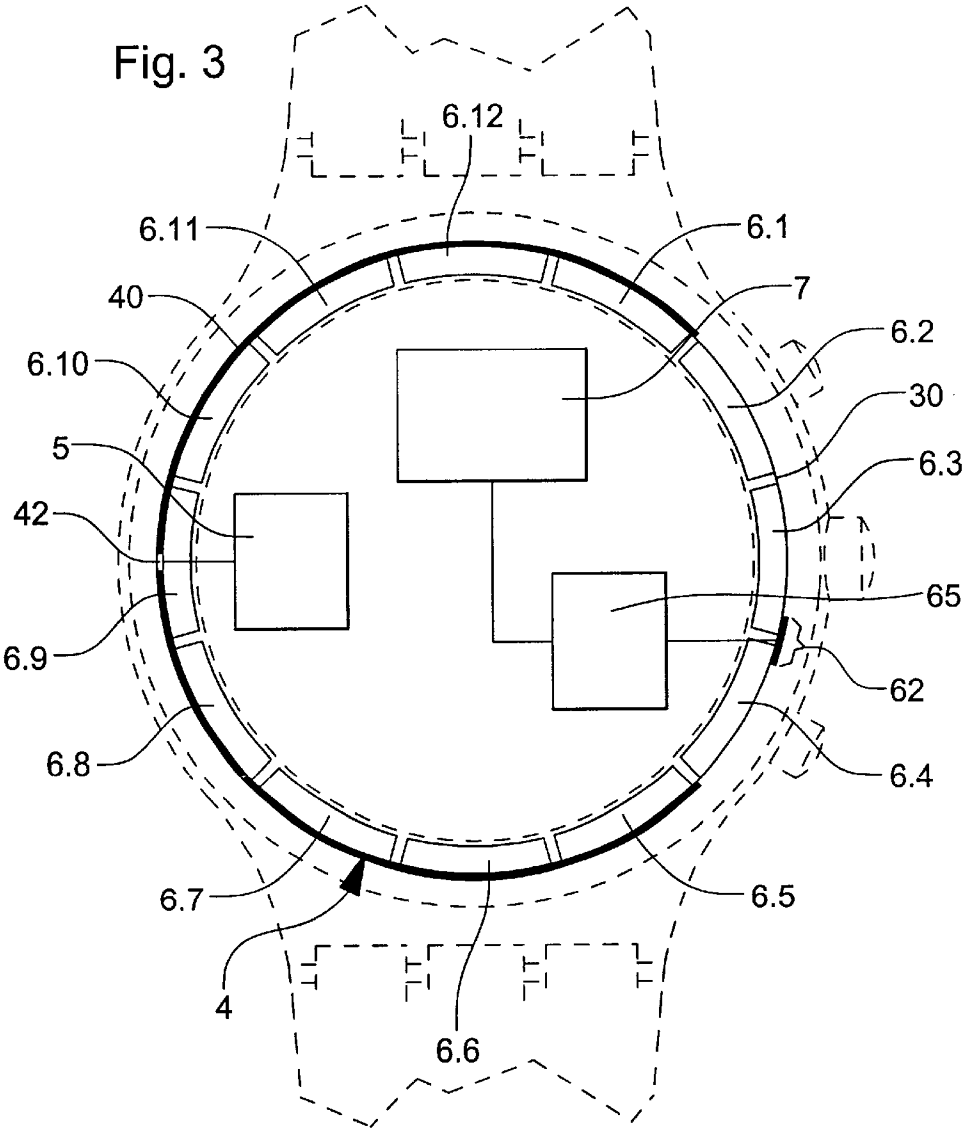
FIG. 3 is a simplified plan view of the horological piece according to the present invention, illustrating the subassembly combining the antenna and the positions sensors of FIG. 2 in its mounting position.

For the purpose of explanation, there is illustrated on FIG. 3 in the form of a simplified plan view of the horological piece 1, the antenna-sensors subassembly of FIG. 2 in its mounting position. When mounted, the position sensors 6.1 to 6.12 are thus disposed so as to form a symmetric arrangement with respect to the radiating element 40, that is to say on each side of the connecting point 42 of the antenna 4. Accordingly one sees on FIGS. 2 and 3 that an axis of symmetry of the antenna 4 passes by the position sensor referred by numeral 6.9.

It has to be pointed out that the particular arrangement of the position sensors 6.1 to 6.12 represented in the embodiment illustrated on FIGS. 2 and 3 is in no way limitative. It is indeed possible to conceive other arrangements of the antenna 4 and/or of the position sensors 6.1 and 6.12 for which a symmetry of the whole is also achieved. In particular, the position sensors 6.1 to 6.12 represented on FIGS. 2 and 3 may be disposed so that the axis of symmetry of the antenna 4 passes between two adjacent position sensors.

In order to avoid that a radiation emanating from the antenna 4 perturbs the electronic control means 7 of the position sensors 6.1 to 6.12 by coupling, additional filtering components (not represented) are also provided on the connecting lines 60.1 to 60.12.

Figure 4:
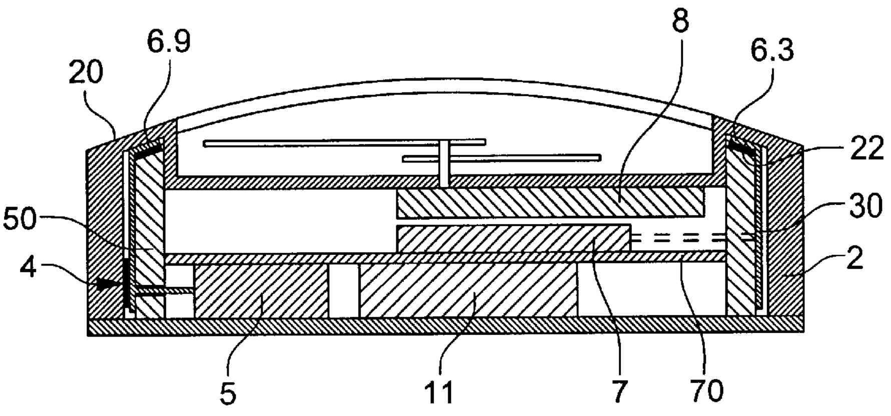
FIG. 4 is a sectional view of the horological piece of FIG. 1.

FIG. 4 is a simplified sectional view taken along an axis 9h-3h of the horological piece of FIG. 1. It comprises-the watch case 2, the micro emitter-receiver 5 associated to the antenna 4, the electronic control means 7 of the position sensors 6.1 to 6.12, the horological movement 8 and the power supply source 11.

The isolating support 30 of FIG. 2 bearing the antenna 4 and the position sensors 6.1 to 6.12 is wound in a peripheral region of the watch case 2.

Preferably, the position sensors 6.1 to 6.12 are in addition bent radially towards the interior of the horological piece 1, as represented on FIG. 4, so that they press against an internal surface of the bezel 20 in order to optimise the sensitivity of the sensors.

In addition, an internal ring 50 is preferably disposed in the watch case 2 of the horological piece so that the isolating support 30 is sandwiched between the watch case 2 and the internal ring 50. This internal ring 50 further permit to assure that the position sensors 6.1 to 6.12 press correctly against the internal surface 22 of the bezel 20 so that the functioning of the sensors is optimised.

One can see that the arrangement formed by the combination of the antenna 4 and the position sensors 6.1 to 6.12 on the same support, according to the invention, permits to greatly simplify the fabrication as well as the mounting of the antenna and the sensors.

Finally, it has to be pointed out that several modification and/or simplifications may be brought to the horological piece according to the present invention without departing from its scope. In particular, the arrangement of the position sensors on the isolating support represented in the embodiment of FIG. 2 is not limitative.

What is claimed is:

1. A portable electronic device enabling reception or emission of radio diffused messages as well as selection of predetermined information, said electronic device comprising:

a case;

a subassembly wound in a peripheral region of said case so as to form a cylindrical arrangement, said subassembly comprising an antenna comprising a radiating element adapted to receive or emit an electromagnetic field bearing said radio diffused messages, and position sensors arranged to enable said selection of predetermined information, said antenna and said position sensors being disposed on opposite surfaces of a same insulating support;

a micro-emitter-receiver enabling to emit or receive said messages with the antenna; and electronic control means associated with said position sensors in order to enable said selection of predetermined information.

2. The device according to claim 1, wherein said position sensors are disposed on said insulating support so as to form a symmetric arrangement with respect to said radiating element of said antenna.

3. The device according to claim 1, wherein filtering components are provided on connecting lines of said position sensors for preventing a radiation emanating from said antenna from perturbing a function of said position sensors.

4. The device according to claim 1, wherein said in isolating support is constituted of a dielectric substrate made of flexible material.

5. A horological piece comprising:

a watch case;

a subassembly wound in a peripheral region of said watch case so as to form a cylindrical arrangement, said subassembly comprising an antenna comprising a radiating element adapted to receive or emit an electromagnetic field bearing radio diffused messages, and position sensors arranged to enable said selection of predetermined information, said antenna and said position sensors being disposed on opposite surfaces of a same isolating support;

a micro-emitter-receiver enabling to emit or receive said messages with the antenna; and electronic control means associated with said position sensors in order to enable said selection of predetermined information.

6. The horological piece according to claim 5 wherein said position sensors press against a bezel of the horological piece.

7. The horological piece according to claim 5, wherein said position sensors are bent radially towards an interior of said watch case.

8. The horological piece according to claim 5, wherein said position sensors are disposed on said insulating support so as to form a symmetric arrangement with respect to said radiating element of said antenna.

* * * * *